United States Patent
Caulfield et al.

(10) Patent No.: US 11,436,823 B1
(45) Date of Patent: Sep. 6, 2022

(54) HIGH RESOLUTION FAST FRAMING INFRARED DETECTION SYSTEM

(71) Applicant: Cyan Systems, Goleta, CA (US)

(72) Inventors: John Caulfield, Santa Barbara, CA (US); Jon Paul Curzan, Arroyo Grande, CA (US); Kenton Veeder, Goleta, CA (US)

(73) Assignee: Cyan Systems, Santa Barbara, CA (US)

(*) Notice: Subject to any disclaimer, the term of this patent is extended or adjusted under 35 U.S.C. 154(b) by 0 days.

(21) Appl. No.: 16/746,759

(22) Filed: Jan. 17, 2020

Related U.S. Application Data

(60) Provisional application No. 62/794,957, filed on Jan. 21, 2019, provisional application No. 62/840,123, filed on Apr. 29, 2019, provisional application No. 62/868,445, filed on Jun. 28, 2019.

(51) Int. Cl.
*G06V 10/94* (2022.01)
*G06V 10/75* (2022.01)
*H04N 5/33* (2006.01)
*H04N 5/341* (2011.01)

(52) U.S. Cl.
CPC .......... *G06V 10/94* (2022.01); *G06V 10/7515* (2022.01); *H04N 5/33* (2013.01); *H04N 5/341* (2013.01)

(58) Field of Classification Search
None
See application file for complete search history.

(56) References Cited

U.S. PATENT DOCUMENTS

| | | | |
|---|---|---|---|
| 3,699,341 | A | 10/1972 | Quillinan |
| 3,936,822 | A | 2/1976 | Hirschberg |
| 4,684,812 | A | 8/1987 | Tew |

(Continued)

FOREIGN PATENT DOCUMENTS

| | | | | |
|---|---|---|---|---|
| CN | 101574567 | | 8/2011 | |
| CN | 102486709 A | * | 6/2012 | ........... G06F 3/0416 |

(Continued)

OTHER PUBLICATIONS

Torrey Pines Logic, Product Release, New Mini Thermal Zoom Imagers from Torrey Pines Logic—The New T12 is Small Enough for a Pistol with all the Features of Larger More Expensive Imagers, Nov. 3, 2015.

(Continued)

*Primary Examiner* — Mohammed Rachedine
(74) *Attorney, Agent, or Firm* — Van Pelt, Yi & James LLP

(57) ABSTRACT

A mechanism for radiation detection is disclosed. An integrated circuit usable in detecting radiation includes a plurality of readout circuits is described. A readout circuit of the plurality of readout circuits includes an integration capacitor and an averaging capacitor. The integration capacitor is coupled with a pixel of a photodetector pixel array. The pixel has a pixel area. An available area less than the pixel area is usable for layout of the integration capacitor. The integration capacitor has a capacitor area less than the available area. The averaging capacitor has an averaging capacitance greater than the integration capacitance of the integration capacitor. In some aspects, the integrated circuit further includes at least one cascaded averaging circuit coupled with the averaging capacitor.

22 Claims, 6 Drawing Sheets

(56) References Cited

U.S. PATENT DOCUMENTS

| | | | |
|---|---|---|---|
| 4,779,004 A * | 10/1988 | Tew | H01L 21/465 |
| | | | 257/E29.096 |
| 4,780,719 A | 10/1988 | Frei | |
| 4,917,490 A | 4/1990 | Schaffer, Jr. | |
| 5,196,689 A | 3/1993 | Sugita | |
| 5,246,868 A | 9/1993 | Busch | |
| 5,473,162 A | 12/1995 | Busch | |
| 5,504,717 A | 4/1996 | Sharkey | |
| 5,596,509 A | 1/1997 | Karr | |
| 5,612,676 A | 3/1997 | Plimpton | |
| 5,629,522 A | 5/1997 | Martin | |
| 5,703,835 A | 12/1997 | Sharkey | |
| 5,796,474 A | 8/1998 | Squire | |
| 5,973,998 A | 10/1999 | Showen | |
| 6,178,141 B1 | 1/2001 | Duckworth | |
| 6,357,158 B1 | 3/2002 | Smith, III | |
| 6,449,540 B1 | 9/2002 | Rayner | |
| 6,496,593 B1 | 12/2002 | Krone, Jr. | |
| 6,819,495 B2 | 11/2004 | Shani | |
| 6,840,342 B1 | 1/2005 | Hahn | |
| 6,847,587 B2 | 1/2005 | Patterson | |
| 6,965,541 B2 | 11/2005 | Lapin | |
| 6,985,337 B2 | 1/2006 | Dieny | |
| 7,114,846 B2 | 10/2006 | Tominaga | |
| 7,139,222 B1 | 11/2006 | Baxter | |
| 7,266,045 B2 | 9/2007 | Baxter | |
| 7,409,899 B1 | 8/2008 | Beekman | |
| 7,411,865 B2 | 8/2008 | Calhoun | |
| 7,420,878 B2 | 9/2008 | Holmes | |
| 7,423,272 B2 | 9/2008 | Hasegawa | |
| 7,474,589 B2 | 1/2009 | Showen | |
| 7,532,542 B2 | 5/2009 | Baxter | |
| 7,551,059 B2 | 6/2009 | Farrier | |
| 7,586,812 B2 | 9/2009 | Baxter | |
| 7,599,252 B2 | 10/2009 | Showen | |
| 7,602,329 B2 | 10/2009 | Manderville | |
| 7,646,419 B2 | 1/2010 | Cernasov | |
| 7,688,679 B2 | 3/2010 | Baxter | |
| 7,696,919 B2 | 4/2010 | Moraites | |
| 7,710,278 B2 | 5/2010 | Holmes | |
| 7,719,428 B2 | 5/2010 | Fisher | |
| 7,732,771 B2 | 6/2010 | Hasegawa | |
| 7,750,814 B2 | 7/2010 | Fisher | |
| 7,751,282 B2 | 7/2010 | Holmes | |
| 7,755,495 B2 | 7/2010 | Baxter | |
| 7,796,470 B1 | 9/2010 | Lauder | |
| 7,855,935 B1 | 12/2010 | Lauder | |
| 7,947,954 B2 | 5/2011 | Snider | |
| 7,961,550 B2 | 6/2011 | Calhoun | |
| 8,036,065 B2 | 10/2011 | Baxter | |
| 8,049,659 B1 | 11/2011 | Sullivan | |
| 8,063,773 B2 | 11/2011 | Fisher | |
| 8,111,289 B2 | 2/2012 | Zruya | |
| 8,134,889 B1 | 3/2012 | Showen | |
| 8,170,731 B2 | 5/2012 | Martinez | |
| 8,212,210 B2 | 7/2012 | Hargel | |
| 8,325,563 B2 | 12/2012 | Calhoun | |
| 8,334,770 B2 | 12/2012 | Gurton | |
| 8,351,297 B2 | 1/2013 | Lauder | |
| 8,369,184 B2 | 2/2013 | Calhoun | |
| 8,421,015 B1 | 4/2013 | Scott | |
| 8,483,567 B2 | 7/2013 | Armentrout | |
| 8,748,816 B2 | 6/2014 | Kooijman | |
| 8,809,787 B2 | 8/2014 | Tidhar | |
| 8,825,562 B2 | 9/2014 | Walker | |
| 8,868,288 B2 | 10/2014 | Plante | |
| 8,880,279 B2 | 11/2014 | Plante | |
| 8,892,310 B1 | 11/2014 | Palmer | |
| 8,904,689 B2 | 12/2014 | Kountotsis | |
| 8,955,421 B1 | 2/2015 | Kountotsis | |
| 8,970,706 B2 | 3/2015 | Scott | |
| 8,981,989 B2 | 3/2015 | Gould | |
| 8,989,959 B2 | 3/2015 | Plante | |
| 8,995,227 B1 | 3/2015 | Johnson | |
| 8,996,240 B2 | 3/2015 | Plante | |
| 9,183,679 B2 | 11/2015 | Plante | |
| 9,201,842 B2 | 12/2015 | Plante | |
| 9,208,129 B2 | 12/2015 | Plante | |
| 9,226,004 B1 | 12/2015 | Plante | |
| 9,234,963 B2 | 1/2016 | Rakeman | |
| 9,294,690 B1 | 3/2016 | Caulfield | |
| 9,402,060 B2 | 7/2016 | Plante | |
| 9,472,029 B2 | 10/2016 | Plante | |
| 9,488,442 B2 | 11/2016 | Varga | |
| 9,501,878 B2 | 11/2016 | Palmer | |
| 9,545,881 B2 | 1/2017 | Plante | |
| 9,554,080 B2 | 1/2017 | Plante | |
| 9,566,910 B2 | 2/2017 | Plante | |
| 9,594,371 B1 | 3/2017 | Palmer | |
| 2003/0232297 A1 | 12/2003 | Pareek | |
| 2004/0057121 A1 | 3/2004 | Shani | |
| 2004/0208223 A1 | 10/2004 | Tominaga | |
| 2005/0224716 A1 | 10/2005 | Armentrout | |
| 2005/0285953 A1 | 12/2005 | Hasegawa | |
| 2006/0049036 A1 | 3/2006 | Zruya | |
| 2006/0078037 A1 | 4/2006 | Lee | |
| 2006/0113458 A1 * | 6/2006 | Yang | H04N 9/04557 |
| | | | 348/E9.01 |
| 2007/0040062 A1 | 2/2007 | Lau | |
| 2007/0170359 A1 * | 7/2007 | Syllaios | H04N 5/332 |
| | | | 348/E5.09 |
| 2008/0106727 A1 | 5/2008 | Cernasov | |
| 2008/0136626 A1 | 6/2008 | Hudson | |
| 2008/0291075 A1 | 11/2008 | Rapanotti | |
| 2009/0080700 A1 | 3/2009 | Lau | |
| 2009/0121925 A1 | 5/2009 | Scott | |
| 2009/0260511 A1 | 10/2009 | Melnychuk | |
| 2009/0276110 A1 | 11/2009 | Martinez | |
| 2009/0290019 A1 | 11/2009 | McNelis | |
| 2009/0292467 A1 | 11/2009 | McNelis | |
| 2009/0294666 A1 | 12/2009 | Hargel | |
| 2009/0320348 A1 | 12/2009 | Kelly | |
| 2010/0079280 A1 | 4/2010 | Lacaze | |
| 2010/0226210 A1 | 9/2010 | Kordis | |
| 2010/0245644 A1 * | 9/2010 | Ellis-Monaghan | |
| | | | H04N 5/35581 |
| | | | 348/308 |
| 2011/0025521 A1 | 2/2011 | Gurton | |
| 2011/0095187 A1 | 4/2011 | Snider | |
| 2011/0170798 A1 | 7/2011 | Tidhar | |
| 2011/0261193 A1 | 10/2011 | Agurok | |
| 2011/0315767 A1 | 12/2011 | Lowrance | |
| 2013/0088594 A1 * | 4/2013 | Wyles | H04N 5/347 |
| | | | 348/148 |
| 2013/0140433 A1 | 6/2013 | Oggier | |
| 2013/0308939 A1 | 11/2013 | Armentrout | |
| 2015/0192667 A1 | 7/2015 | Rakeman | |
| 2016/0232774 A1 | 8/2016 | Noland | |
| 2017/0123487 A1 | 5/2017 | Hazra | |
| 2017/0318238 A1 | 11/2017 | Sugiyama | |
| 2019/0064310 A1 | 2/2019 | Tsang | |
| 2019/0124264 A1 | 4/2019 | Kogure | |
| 2019/0379852 A1 * | 12/2019 | Akahori | H04N 5/3559 |

FOREIGN PATENT DOCUMENTS

| | | | |
|---|---|---|---|
| CN | 103091249 | 5/2013 | |
| CN | 107077020 A * | 8/2017 | G02F 1/13338 |
| EP | 1122508 | 10/2005 | |
| EP | 2533001 | 12/2012 | |
| EP | 2911092 | 8/2015 | |
| IL | 169836 | 11/2010 | |
| JP | 2019216315 A * | 12/2019 | H01L 27/14603 |
| WO | 2000019052 | 4/2000 | |
| WO | 2004008403 | 1/2004 | |
| WO | WO-2005045380 A1 * | 5/2005 | G01J 1/4204 |
| WO | 2007088552 | 8/2007 | |
| WO | 2007107988 | 9/2007 | |
| WO | 2008060257 | 5/2008 | |

(56) References Cited

FOREIGN PATENT DOCUMENTS

| WO | 2009102310 | 8/2009 |
|---|---|---|
| WO | 2016142549 | 9/2016 |

OTHER PUBLICATIONS

Allison Barrie, Sniper Detectors Coming to America's Heartland, FOX Firepower, Dec. 22, 2011.
Andrew White, Fighting Fire with Fire: Technology Finds a Solution to Sniper Attacks, Jane's International Defence Review, Jun. 2009, pp. 52-57.
Andy Nativi, AW I Countersniper Systems Detect Hidden Shooters, Defense & Aerospace News, News from the Defense & Aerospace Industry, Dec. 22, 2011, pp. 1-3.
Arnold Goldberg, Infrared Signatures of the Muzzle Flash of a 120mm Tank Gun and their Implications for the Kinetic Energy Active Protection System (KEAPS), Army Research Laboratory, ARL-TR-909, Oct. 2001.
Asfaw et al., Impact of Pose and Glasses on Face Detection Using the Red Eye Effect, Mar. 2003.
Associated Press, Infrared Detects Sniper Gunfire, WIRED, Associated Press, Science, Oct. 29, 2005.
Author Unknown, Infantry: Sniper Detectors Arrive, Aug. 22, 2009, Strategy World.
Author Unknown, SLD500 Sniper Locator, May 11, 2006.
Brown et al., Ku-Band Retrodirective Radar for Ballistic Projectile Detection and Tracking, IEEE, 2009, pp. 1-4.
Callan et al., Sensors to Support the Soldier, Feb. 3, 2005, pp. 1-101.
Caulfield et al., Small Pixel Infrared Sensor Technology, Proceedings of SPIE 10177, Infrared Technology and Applications XLIII, 1017725 (May 3, 2017).
Chris Hughes, British Troops to get iPod-Sized "Sniper Finders" to take on Deadly Sharpshooters in Afghanistan, Mar. 8, 2011.
David Crane, Anti-Sniper/Sniper Detection/Gunfire Detection Systems at a Glance, Defensereview.com, Jul. 19, 2006.
David Crane, Torrey Pines Logic Mirage—1200 and Myth-350 Handheld Sniper Detection Systems, Defensereview.com, Dec. 8, 2008.
Douglas et al., The Objective Force Soldier/Soldier Team, Army Science Board, FY2001 Summer Study, Final Report, vol. II The Science and Technology Challenges, Nov. 2001.
Duckworth et al., Fixed and Wearable Acoustic Counter-Sniper Systems for Law Enforcement, SPIE Conference an Sensors, C3I, Information, and Training Technologies for Law Enforcement, Boston MA, Nov. 1998.
Ertem et al., An Acoustic Sensor for the Viper Infrared Sniper Detection System, Aug. 1999.
Francis Flinch, Wikipedia, User Talk: Francis Flinch, Apr. 10, 2019, p. 1-32.
IRobot, Combat-Proven Robot to be Equipped with Enhanced Laser, Optical & Acoustic Systems, iRobot and Boston Univ. Photonics Center Unveil Advanced Sniper Detection System for iRobot PackBot, Oct. 3, 2005.
John Keller, Sniper-Detection Systems to Provide Perimeter Security for Army Forces in Afghanistan to come from Raytheon BBN, Feb. 15, 2011.
Law et al., Multi-Speclral Signature Analysis Measurements of Selected Sniper Rifles and Small Arms, Proc. SPIE 2938,Command, Control, Communications, and Intelligence Systems for Law Enforcement, (Feb. 18, 1997), pp. 288-298.
Li et al., Real-Time Tracking of Bullet Trajectory Based on Chirp Transform in a Multi-Sensor Multi-Frequency Radar, Center for Advanced Communications, Villanova University, IEEE 2010, pp. 1203-1207.
Michael Naimark, How to ZAP a Camera: Using Lasers to Temporarily Neutralize Camera Sensors, Camera Zapper, Oct. 2002.
Moroz et al., Airborne Deployment of and Recent Improvements to the Viper Counter Sniper System, 1999, Naval Research Laboratory.
Nigel F. Evans, British Artillery Fire Control Ballistics & Data, Apr. 28, 2014.
Noah Shachtman, Lasers Stop Snipers Before They Fire (updated), Apr. 26, 2007.
Peter A. Buxbaum, Pinpointing Sniper Perches, Aug. 2010, SOTECH 8.6, pp. 11-14.
Rafael, Anti-Sniper Systems Finding Their Range, Defense Industry Daily, Nov. 3, 2005.
Robert D. Fiete, Image Quality and $\lambda FN/p$ for Remote Sensing Systems, Opt. Eng. 38 (7), pp. 1229-1240, (1999).
Scanlon et al., Networked Acoustic Sensor Array's Performance During 2004 Horizontal Fusion—Warrior's Edge Demonstration, Dec. 2004, US Army Research Laboratory, pp. 1-8.
Simon et al., Sensor Network-Based Countersniper System, SenSys'04, Nov. 3-5, 2004.
Simonis et al., Nanotechnology, Innovation Opportunities for Tomorrow's Defence, TNO Science & Industries, Mar. 2006.
Tim Hornyak, U.S. Troops Getting Wearable Gunshot Detectors, A Shoulder-Mounted Unit with Four Acoustic Sensors and a Chest Display that Attaches to Body Armor can Show the Direction and Distance of Sniper Fire in a Fraction of a Second, Mar. 21, 2011.
Tina Cipara, Using Radar Signals to Safegauard our Troops, Mason Research, Mar. 15, 2011.
Tom Vanden Brook, High-Tech Device Helps U.S. Troops Pinpoint Snipers, USA Today, Mar. 2, 2011.
W.E. Tennant, "Rule 07" Revisited: Still a Good Heuristic Predictor of p/n HgCdTe Photodiode Performance?, Journal of Electronic Materials, vol. 39, No. 7, 2010.
Wikipedia, External Ballistics, Dec. 2, 2018.
Wikipedia, External Ballistics, Jan. 31, 2012.
Wikipedia, Talk: External Ballistics, Jun. 5, 2015.
Zhang et al., Real-Time Acquisition and Tracking of Sniper Bullets using Multi-Sensor Multi-Frequency Radar Techniques, Center for Advanced Communications, Villanova University, IEEE, 2009, pp. 265-268.

\* cited by examiner

HIGH RESOLUTION FAST FRAMING INFRARED DETECTION SYSTEM

CROSS REFERENCE TO OTHER APPLICATIONS

This application claims priority to U.S. Provisional Patent Application No. 62/794,957 entitled HIGH RESOLUTION FAST FRAMING FOCAL PLANE ROIC APPARATUS, filed Jan. 21, 2019, U.S. Provisional Patent Application No. 62/840,123 entitled PROJECTILE TRACKING AND 3D TRACEBACK METHOD, filed Apr. 29, 2019, and U.S. Provisional Patent Application No. 62/868,445 entitled FAST MOVING TARGET IMAGING SENSOR, filed Jun. 28, 2019 all of which are incorporated herein by reference for all purposes.

GOVERNMENT SUPPORT

This invention was made with support under contract FA865116-C-0007 awarded by the Airforce Research Laboratory. The government has certain rights in the invention.

BACKGROUND OF THE INVENTION

Current infrared radiation (IR) detection systems include a lens, a detector having an array of pixels and a readout integrated circuit (ROIC). The lens focuses infrared light onto pixels in the detector array. The pixels provide an electrical signal based upon the light received and provide this signal to the ROIC, which processes the signal.

Higher temporal and spatial resolution IR detection systems are desired to improve capability to detect small/dim and/or faster moving targets. One mechanism for obtaining higher frequency spatial response and improved resolution may be the use of smaller pixels in the detector. However, current imagers with smaller pixels suffer from lower optical throughput and reduced charge storage capacity. Further, smaller pixels typically have a higher noise relative to the signals. Thus, smaller pixels may result in a higher signal-to-noise ratio as compared to larger pixels. Consequently, current IR detection systems have pixels having a ten micrometer or more pitch. A mechanism for providing an infrared detection system having with improved resolution is desired.

BRIEF DESCRIPTION OF THE DRAWINGS

Various embodiments of the invention are disclosed in the following detailed description and the accompanying drawings.

DETAILED DESCRIPTION

Figure 1A:
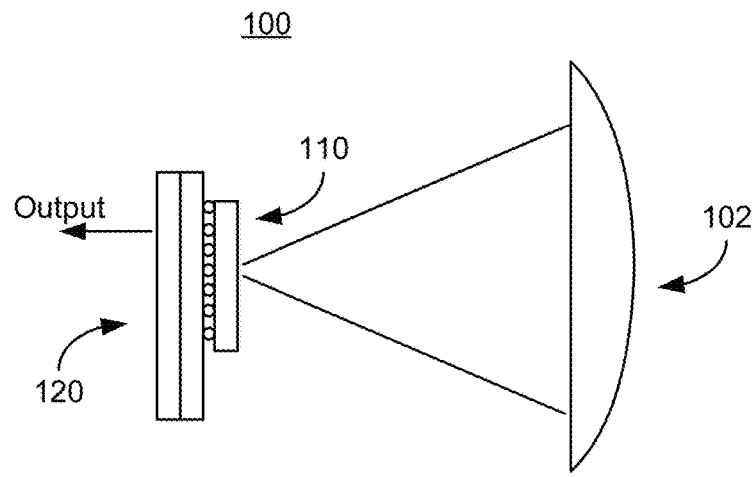
FIGS. 1A-1B depict an embodiment of an infrared detection system.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Current infrared radiation (IR) detection systems, such as an IR focal plane array, include a lens, a detector array having an array of pixels that may reside at the focal plane of the lens and a readout integrated circuit (ROIC). For each pixel, the ROIC typically includes a direct injection integration capacitor and transistor that are typically disposed in line with the pixel, as well as a sample and hold capacitor. Other pixel input circuits may be used such as a CTIA, SFD, or other type of input circuits. The ROIC also includes switches that allow for reset, charging and sampling of the integration capacitor. Photocurrent from a pixel in the detector is provided to the integration and sample and hold capacitors. The signal on the sample and hold capacitor can be read out while a reset and another integration cycle is occurring on the integration capacitor. Thus, a readout of the integrated signal and noise may be obtained.

Higher resolution IR detection systems that are capable of being installed on smaller platforms are desired. One mechanism for progressing toward this goal is to use a detector having smaller pixels. However, the use of smaller pixels results in various drawbacks. Smaller pixels can exhibit limited photo signal collection efficiency because less light impinges on the reduced photoactive area. Thus, the number of photons collected or photocurrent response of such pixels may be less than for larger pixels. The instantaneous fields of view (IFOVs) for smaller pixels may also create smearing with even modest movement of the target and/or the platform carrying the IR detection system. ROICs used with smaller pixel detectors can suffer from low native capacitance for the integration capacitor due to reduced layout area. Therefore, such systems have low well capacity and reduced dynamic range.

In order to address some of these issues, particular selections are made for the lens, integration capacitor and pixels. The largest possible integration capacitors having the largest well size are typically used in connection with smaller pixel sizes. Further, to operate small pixel FPAs with a proper MTF and provide Nyquist spatial sampling, the lens typically has an f-number (the ratio of the focal length to the clear aperture) of greater than two for a ten micrometer pitch pixel. For example, a detector using small pixels may have a pixel pitch as low as a ten micrometers (i.e. each pixel is 10 µm×10 µm or larger). For a ten micrometer pitch pixel, approximately one hundred square micrometers are available for layout of ROIC components aligned with the pixel. The transistor utilizes some of this available area and the integration capacitor consumes substantially all of the remaining area. In the example above, the transistor may require approximately ten square micrometers. This leaves approximately ninety square micrometers for the integration capacitor. An integration capacitor consuming this area is used. An integration capacitor having a ninety square micrometer area may have a capacitance on the order of one hundred and eighty femto-Farads. Thus, the integration capacitor having the largest storage well possible is used in the ROIC. The lens used with 10 micron pitch pixels typically has an f-number of 2.3. Utilizing such techniques, pixels having a pitch not lower than ten micrometers may be used. However, further improvements in resolution and response are desired.

A radiation detection system is disclosed. The radiation detection system includes an integrated circuit usable in detecting radiation includes a plurality of readout circuits. A readout circuit of the plurality of readout circuits includes an integration capacitor and an averaging capacitor. The integration capacitor is coupled with a pixel of a photodetector pixel array. The pixel has a pixel area. An available area that is not greater than the pixel area is usable for layout of the integration capacitor. The integration capacitor has a capacitor area less than the available area. The averaging capacitor has an averaging capacitance greater than the integration capacitance of the integration capacitor. In some embodiments, the readout circuit includes a transistor coupled to the pixel and the integration capacitor. The transistor has a transistor area such that the available area is not larger than the pixel area minus the transistor area. In some aspects, the readout circuit further includes a switch coupled with the integration capacitor and the averaging capacitor. The switch is configured to provide an integration time, which may be varied, for the integration capacitor. In some embodiments, the integration capacitance is less than twenty femto-Farads. In some embodiments, the integration capacitance is less than ten femto-farads and at least one femto-Farad. In some embodiments, the pixels receive a photo signal from a lens having an f-number less than a Nyquist sampling f-number. For example, the f-number may be greater than 0.8 and less than 1.5 for a system used with a midwave infrared band detector array.

In some embodiments, the readout circuit further includes at least one cascaded averaging circuit coupled with the averaging capacitor. Each cascaded averaging circuit may further include an additional integration capacitor, an additional averaging capacitor coupled with the additional integration capacitor and a switch coupled with the additional integration capacitor and the additional averaging capacitor. The additional averaging capacitor has an additional averaging capacitance greater than the additional integration capacitance of the additional integration capacitor. In some aspects, a first cascaded averaging circuit is coupled to the averaging capacitor through a transistor.

A detection system that may be an IR detection system is also described. The detection system includes a lens having an f-number less than a Nyquist sampling f-number, a photodetector pixel array and a plurality of readout circuits. The photodetector pixel array includes a plurality of pixels and receives a photo signal from the lens. A readout circuit of the plurality of readout circuits includes an integration capacitor and an averaging capacitor. The integration capacitor is coupled with a pixel of the plurality of pixels. In some embodiments, the pixel has a pixel area corresponding to a maximum capacitance of the integration capacitor. The integration capacitor has an integration capacitance less than the maximum capacitance. The averaging capacitor has an averaging capacitance greater than the integration capacitance. In some embodiments, the readout circuit includes switch coupled with the integration capacitor and the averaging capacitor. The switch is configured to provide a variable integration time for the integration capacitor. The readout circuit may also include at least one cascaded averaging circuit coupled with the averaging capacitor. In such embodiments, each of the cascaded averaging circuit(s) further includes an additional integration capacitor, an additional averaging capacitor, and a switch between the additional integration capacitor and the additional averaging capacitor. The additional averaging capacitor has an additional averaging capacitance greater than the additional integration capacitance of the additional integration capacitor. In some embodiments, the integration capacitance is less than ten femto-farads and at least one femto-Farad. In some embodiments, the f-number is greater than 0.8 and less than 1.5 for a midwave infrared band detector array.

A method for detecting IR signals is also described. The method includes setting an integration time for readout circuits such as those described herein. Sampling of the integration capacitor is performed at intervals based on the integration time. In some embodiments, the readout circuit further includes cascaded averaging circuit(s) coupled with the averaging capacitor. The method further includes periodically receiving an averaged signal from the averaging capacitor in cascaded averaging circuit(s). A cascaded averaged signal is provided from the cascaded averaging circuit(s) and is based on successive integration and averaging from the integration capacitor on to one or more downstream cascaded averaging circuits for the pixel signal.

Figure 1B:
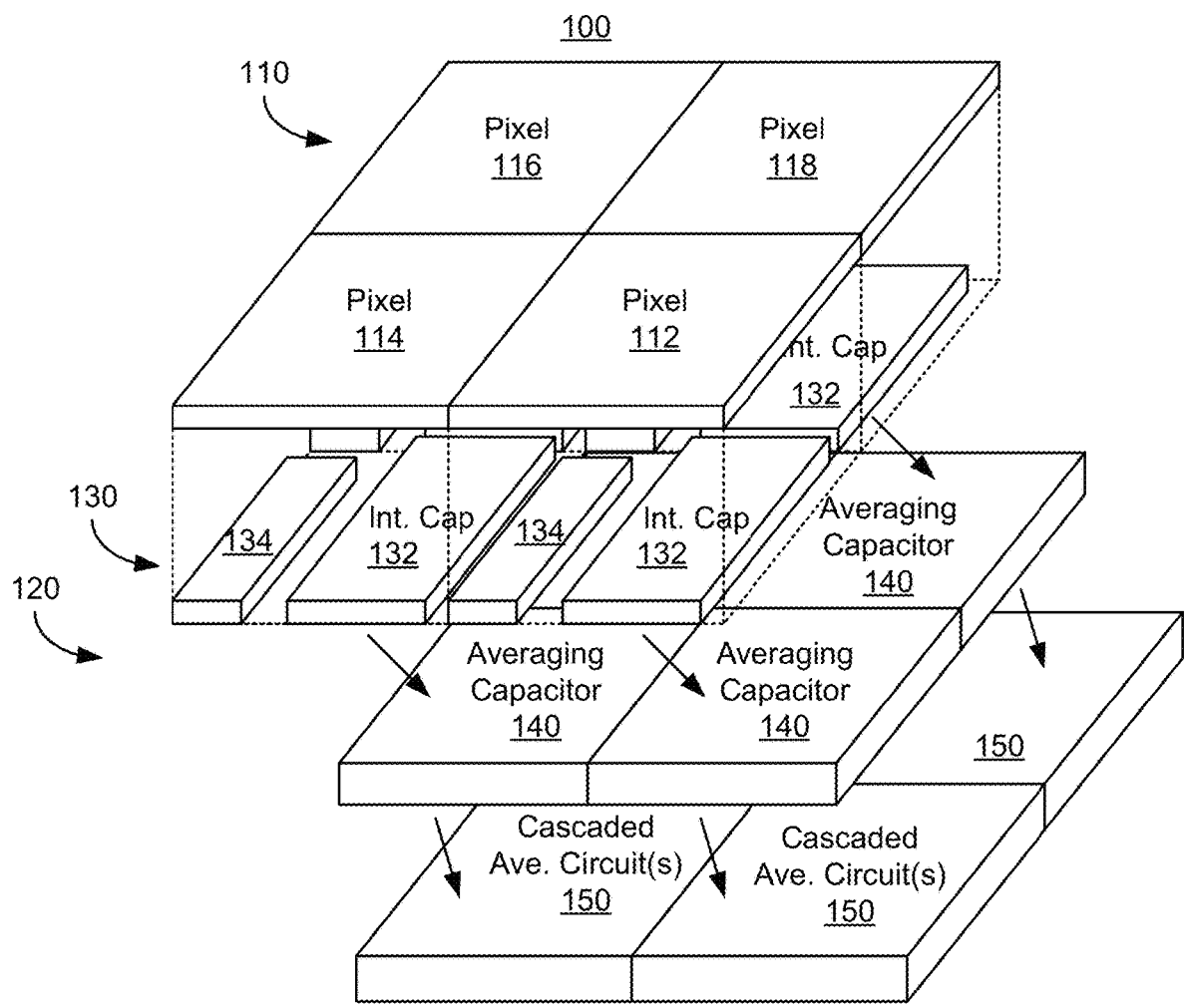

FIGS. 1A-1B are block diagrams depicting an embodiment of detection system 100. FIG. 1A is a side view of detection system 100. FIG. 1B is an exploded view of a portion of detection system 100. FIGS. 1A-1B are not to scale and only some components are shown. For example, FIG. 1B is intended to indicate relative areas and thus does not include various elements of detection system 100. In some embodiments, detection system 100 is an infrared radiation (IR) detection system. Thus, system 100 is described in the context of infrared detection. However, in some embodiments, detection system 100 might be used in connection with other wavelengths of light. IR detection system 100 includes lens 102, detector array 110 that includes an array of pixels, and read out integrated circuit (ROIC) 120. Lens 102 focuses light down to a tightly focused spot. In some embodiments, lens 102 focuses light to cover only a few pixels at a time. For example, the spot may impinge on 1, 2, 3, 4, 5 or 6 pixels of detector array 110 at a particular time. In some embodiments, lens 102 is configured to have an f-number equal or less than that required for Nyquist sampling with 5 micron pixels (e.g. typically less than 2). For example, lens 102 may have an f-number greater than 0.8 and less than 1.5 for a midwave infrared band detector. In some embodiments, lens 102 has an f-number that is nominally one. In other embodiments, lens 102 may have a different f-number, including but not limited to 1.8-2.3 (e.g. nominally 2.0).

Detector 110 is shown as a monolithic hybrid bumped interconnected detector. For example, detector 110 may be a low band gap IR detector. In some embodiments, detector 110 may be another type of detector. Detector 110 includes an array of pixels, of which only four pixels 112, 114, 116 and 118 are shown in FIG. 1B. In some embodiments, pixels 112, 114, 116 and 118 are aligned with solder bumps (not shown in FIG. 1B) which provide connection to the underlying ROIC 120. Pixels 112, 114, 116 and 118 may be considered to function as photodiodes. In some embodiments, pixels 112, 114, 116 and 118 have the same size. In some embodiments, pixels 112, 114, 116 and 118 are substantially square. In other embodiments, pixels 112, 114, 116 and 118 may have different sizes and/or other shapes. Pixels 112, 114, 116 and 118 are desired to be small. For example, detector 110 may have a pixel pitch of less than ten micrometers (e.g. pixels 112, 114, 116 and 118 being smaller than 10 μm×10 μm). In some embodiments, pixels 112, 114, 116 and 118 may have a pitch of not more than eight micrometers ((e.g. pixels 112, 114, 116 and 118 being smaller than 8 μm×8 μm). In some embodiments, detector 110 may have a pixel pitch of not more than six micrometers. For example, pixels 112, 114, 116 and 118 may have a pitch of five micrometers or less (e.g. pixels 112, 114, 116 and 118 being 5 μm×5 μm or smaller). In some embodiments, detector 110 may have a pixel pitch of not more than three micrometers. Thus, pixels 112, 114, 116 and 118 are small in size. The number of pixels in the array of detector 110 may be large. For example, a 1080×1920 array of pixels may be used in detector 110. Other numbers, aspect ratios, numbers or pixels and/or other geometries are possible. The pixels in the array of detector 110 may be read out and processed in a raster scan.

ROIC circuit 120 includes fast integration and readout circuits 130 utilized in providing a faster readout and may include cascaded averaging circuits 150. Each fast readout circuit 130 includes integration capacitor 132, additional component(s) 134, averaging capacitor 140 and may include other elements. For example, switches and other elements are not shown. For example, a switch coupled between capacitors 132 and 140 may be used in periodically providing the signal on integration capacitor 132 to averaging capacitor 140. Additional component(s) 134 may include a transistor coupled adjacent to the corresponding pixel 112, 114, 116 or 118 and integration capacitor 132.

Integration capacitor 132 and additional component(s) 134 are laid out in a manner that may be constrained by the area of pixels 112, 114, 116 and 118. For example, integration capacitor 132 and additional component(s) 134 may be aligned with (e.g. under in an integrated circuit) the corresponding pixel 112, 114, 116 and/or 118. In some embodiments, components 132 and 134 may be in or near the corresponding pixels 112, 114, 116 or 118. Thus, components 132 and 134 may not consume more area than the corresponding pixel 112, 114, 116 and/or 118. Averaging capacitor 140 of readout circuit 130 and cascaded averaging circuits 150 may be laid out in another manner such that the sizes of averaging capacitor 140 and cascaded averaging circuits 150 are not constrained by the areas of pixels 112, 114, 116 and 118 in the same way as for elements 132 and 134. For example, averaging capacitor 140 and/or cascaded averaging circuits 150 may be under the first layer of circuitry of ROIC 120 (e.g. under integration capacitor 132 and other components 134) or adjacent to regions containing integration capacitor 132 and other components 134.

As indicated in FIG. 1B, integration capacitor 132 has an area less than the available area corresponding to pixel 112, 114, 116 and/or 118. Additional components 134 (if any) may occupy a particular portion of the area corresponding to pixels 112, 114, 116 and/or 118. The remaining area corresponding to pixels 112, 114, 116 and/or 118 is the available area. For example, suppose pixels 112, 114, 116 and 118 have a five micrometer pitch (e.g. are 5 μm×5 μm). If no other components are present, the available area is twenty-five square micrometers. In such a case, integration capacitor 132 occupies an area that is less than twenty-five square micrometers. In some embodiments, additional components 134 may include a transistor and/or additional components. Such a transistor might utilize ten square micrometers. For the five micrometer pitch example above, the available area is fifteen square micrometers (twenty-five square micrometers per pixel minus ten micrometers for the transistor). Integration capacitor 132 thus occupies less than fifteen square micrometers in such cases. In some embodiments, integration capacitor 132 occupies less than one-half of the available area. In some such embodiments, integration capacitor 132 occupies not more than one-third of the available area. For example, integration capacitor 132 might consume not more than one-fourth of the available area. As a result, integration capacitor 132 has a capacitance, or well capacity, that is less than is allowed by the available area. In the five micrometer pitch/transistor 134 example above, the available area for integration capacitor 132 is fifteen square micrometers. This available area corresponds to a capacitance of approximately forty-five femto-Farads. Thus, integration capacitor 132 has a capacitance of less than forty-five femto-Farads in this case. In some embodiments, integration capacitor 132 has a capacitance of not more than half of the maximum capacitance for the available area (e.g. not more than twenty femto-Farads for a five micrometer pitch). In some such embodiments, integration capacitor 132 has a capacitance of not more than one-third of the maximum capacitance for the available area (e.g. not more than fifteen femto-Farads for a five micrometer pitch). In some such embodiments, integration capacitor 132 has a capacitance of not more than one quarter of the maximum capacitance for the available area (e.g. not more than twelve femto-Farads for a five micrometer pitch). In some embodiments, the capacitance of integration capacitor 132 is less than ten femto-Farads and at least one femto-Farad. For example, integration capacitor 132 might have a capacitance of 6-7 femto-Farads. Other capacitances are possible in other embodiments, for example based upon the dielectric constant of the insulator used in the capacitor and the area of the capacitor. Integration capacitor 132 may have an integration time of not more than 1000 microseconds. In some embodiments, the integration time is not more than 500 microseconds. The integration time may be not more than 200 microseconds. For example, the integration time is as low as 100 microseconds or less. Other integration times are possible. Thus, integration capacitor 132 may consume a smaller area, have a lower capacitance, a shorter integration time and a significantly higher gain.

In some embodiments, ROIC 120 may be a three-dimensional ROIC. In such embodiments, ROIC 120 may have multiple layers. In such embodiments, elements of ROIC 120 may be vertically stacked and interconnected with vias (not shown). In such embodiments, integration capacitor 132 may have a larger area based on the number of layers of the three-dimensional ROIC. However, the area per layer of such an integration capacitor may still be limited by the size of the corresponding pixel in an analogous manner. Thus, the capacitance of integration capacitor 132 may be limited by the area of the corresponding pixel 112, 114, 116 and/or 118. For a single layer ROIC, this limitation may correspond directly to the area of the pixel. For a three-dimensional ROIC, the pixel area still corresponds to a maximum capacitance of integration capacitor 132. However, maximum capacitance in such a case may be different (e.g. larger than for a single layer ROIC). Thus, integration capacitor 132 may have an integration capacitance less than the maximum capacitance.

Averaging capacitor 140 is coupled with integration capacitor 132, for example through a switch (not shown). Averaging capacitor 140 periodically receives input from integration capacitor 132. For example, a signal may be provided from integration capacitor 132 to averaging capacitor 140 in response to the expiration of a time interval equal to the integration time. This may be accomplished by the periodic closing of the switch. Averaging capacitor 140 has a greater capacitance, and thus well size, than integration capacitor 132. In some embodiments, averaging capacitor 140 has a capacitance that is at least twice and not more than twenty multiplied by the capacitance of integration capacitor 132. Other capacitances are possible. Consequently, the charge on integration capacitor 132 can be periodically provided to averaging capacitor 140 in time intervals substantially equal to the integration time. For lower integration times, more samplings of integration capacitor 132 may be provided to averaging capacitor 140 to improve signal-to-noise ratios.

Averaging capacitor 140 can provide an averaged signal after multiple samplings of integration capacitor 132. Thus, averaging capacitor 140 may be used to reduce noise in a signal provided from integration capacitor 132. Averaging capacitor 140 may still be sampled frequently to provide a fast readout. For example, a frame rate generally refers to sensor frame rate. Faster frame rates, which may meet or exceed 500 frames per second. In some embodiments, fast frame rates are at least 1000 frames per second. Such fast frame rate may be used for high maneuvering threats, jitter and smear reduction on moving platforms, and reduction of atmospheric effects. In some embodiments, framing that is above 1000 frames per second may be called "fast framing". In other embodiments, framing that is above 500 frames per second might be termed fast framing. The fast readout from averaging capacitor 140 is consistent with fast framing in some embodiments. In some embodiments, integration capacitor 132 can be joined though a switch (not-shown) to capacitor 140 and only integrated for one integration cycle on the co-joined capacitors. This co-joined capacitor mode also enables very fast framing. In some embodiments greater than 1000 frames per second may be achieved.

IR detection system 100 may also include one or more cascaded averaging circuits 150 coupled to a corresponding fast readout circuit 130. Cascaded averaging circuit(s) 150 provide additional averaging to the signal from detector 110.

More specifically, cascaded averaging circuit(s) 150 are coupled to a corresponding averaging capacitor 140. In some embodiments, each cascaded averaging circuit 150 includes at least one pair of capacitors arranged in a manner analogous to integration capacitor 132 and averaging capacitor 140. Thus, each cascaded averaging circuit 150 may include an additional integration capacitor (not explicitly shown in FIGS. 1A-1B), an additional averaging capacitor (not explicitly shown in FIGS. 1A-1B) coupled with the additional integration capacitor and a switch coupled between the additional integration capacitor and the additional averaging capacitor. The additional averaging capacitor in the cascaded averaging circuit has an additional averaging capacitance greater than the additional integration capacitance of the additional integration capacitor in the cascaded averaging circuit. In some aspects, cascaded averaging circuit(s) 150 are coupled to the averaging capacitor through a transistor and/or an amplifier. In other embodiments, an amplifier between cascaded averaging circuit and the averaging capacitor may be omitted. Operation of IR detection system 100 is analogous to operation of IR detection system 200, described below.

IR detection system 100 may have improved performance. Detector 110 may include smaller pixels (e.g. less than ten micrometers and five micrometers or less in some embodiments). Consequently, benefits such as improved resolution and reduced noise equivalent power (NEP) may be achieved. Further, IR detection system 100 may address issues resulting from use of smaller pixels 112, 114, 116 and 118. A low f-number lens 102 may be used. Using a low f-number (e.g. less than 2 and nominally 1 in some embodiments) for lens 102 in conjunction with a high gain integration capacitor 132, averaging capacitor 140 and cascaded averaging circuit(s) 150, the low etendue, or light collection efficiency, of small pixels 112, 114, 116 and 118 can be mitigated. ROIC 120 may have circuit components allowing for increased gain for small pixels 112, 114, 116 and 118 while using successive signal averaging stages, such as averaging capacitor 140 and cascaded averaging circuits 150. Use of successive/cascaded averaging stages can reduce noise and hence improve noise equivalent power, signal to noise, and detectivity.

The high gain and low integration time (and smaller capacitance) of integration capacitor 132 may also aid performing fast framing. In some embodiments, frame rates up to and exceeding 1000 frames per second may be supported. Similarly, low integration times, such as two hundred microseconds or less, may be utilized. Thus, multiple closely spaced fast moving events may be imaged on nanosecond or microsecond time scales at long ranges. The data from integration capacitor 132 can be averaged using averaging capacitor 140 so that a dim signal can be detected. Cascaded averaging circuit(s) 150 effectively provides longer integration times and improves dynamic range, signal to noise, and contrast to noise ratio. Each stage of the cascaded averaging circuit 150 reduces noise further and allows a longer time of integration for small pixels so that the signal to noise of smaller pixel may be equal or better than that of larger pixels. The high gain/low integration time of capacitors 132 and 140 in combination with the high effective well capacity of cascaded averaging circuit(s) 150 allows for fast framing, low noise and high well capacity with a design and layout conducive to a small pixel format. Thus, IR detection system 100 may reduce integration times, improve signal-to-noise, increase sensitivity, improve contrast, increase dynamic range, provide higher frame rates and improve imaging using smaller pixels 112, 114, 116 and 118. As a result, target detection, bullet trace back, detection of ultrasonic and hypersonic targets, detection of dim targets, improved resolution of distant targets and other applications may be facilitated.

Figure 2A:
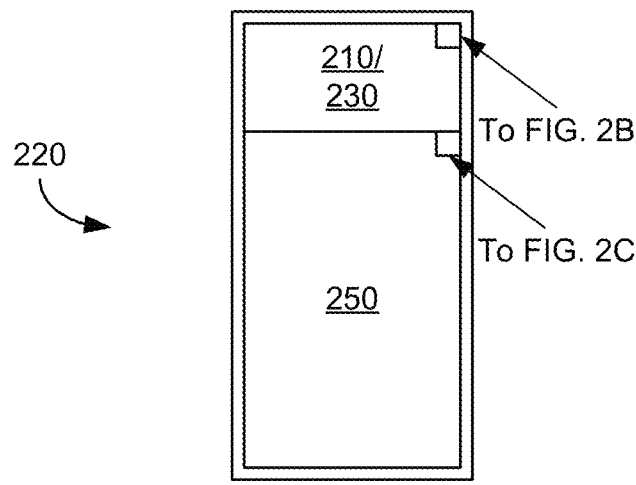
FIGS. 2A-2D depict another embodiment of an infrared detection system.
Figure 2B:
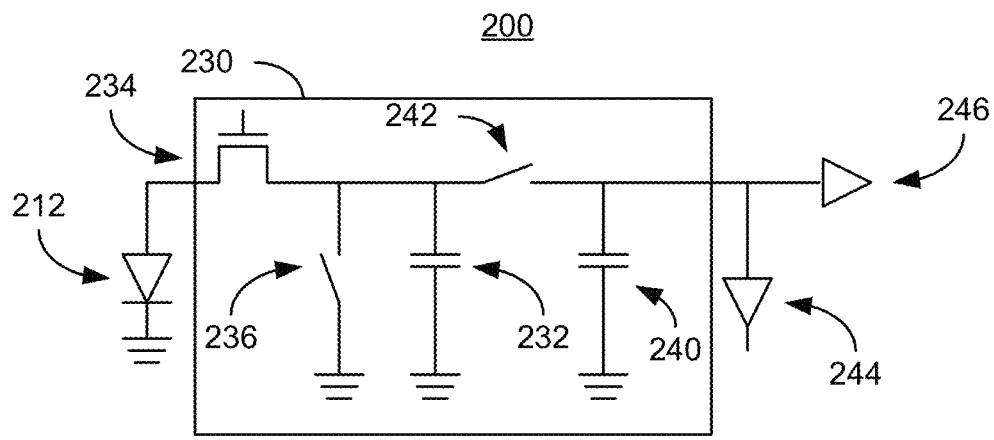
Figure 2C:
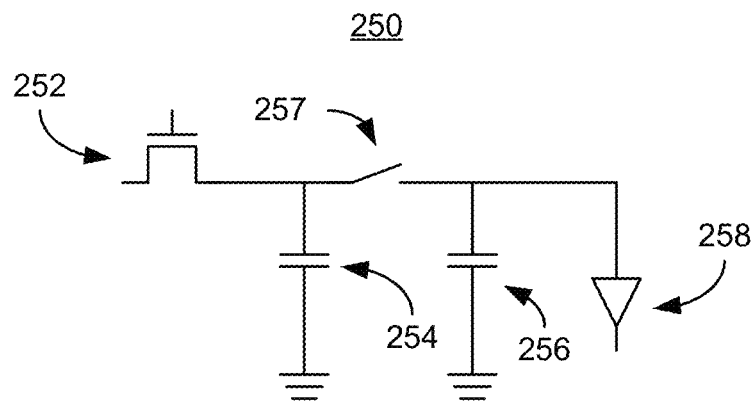
Figure 2D:
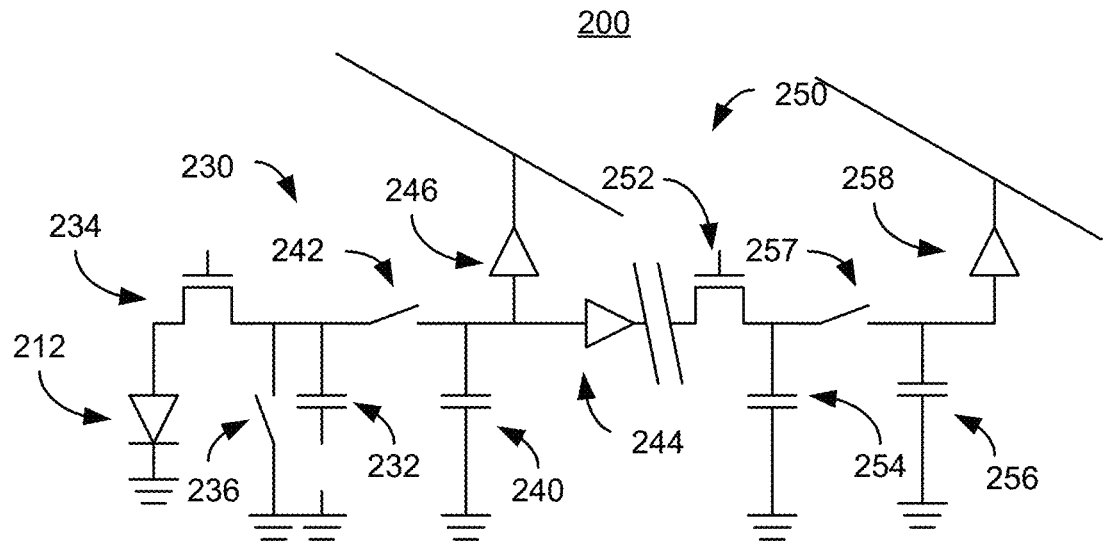

FIGS. 2A-2D depict another embodiment of detection system 200. For clarity, only some components are shown. In some embodiments, detection system 200 is an IR detection system. System 200 is, therefore, described in the context of infrared detection. IR detection system 200 includes detector 210 and ROIC 220. Detector 210 includes an array of pixels and is analogous to detector 110. ROIC 220 that is analogous to ROIC 120. A lens is not shown. However, a lens analogous to lens 102 may be used in connection with IR detection system 200. ROIC 220 includes fast readout circuitry 230 and cascaded averaging circuit(s) 250 that are analogous to readout circuitry 130 and cascaded averaging circuit(s) 150, respectively. FIG. 2A depicts an embodiment of the breakout of components 210, 220, 230 and 250 and is not to scale. FIGS. 2B-2C depict circuit diagrams corresponding to portion of ROIC 220. FIG. 2D depicts an embodiment of connections for components 210, 220, 230 and 250. As indicated by FIG. 2A, readout circuitry 230 may be aligned with (e.g. fabricated under) detector 210. Detector 210 includes an array of pixels analogous to detector 110. Thus, the sizes of the pixels in detector 210 and areas of components in readout circuit 230 are analogous to those described above with respect to detector 110 and readout circuit 110. In the embodiment shown, cascaded averaging circuit(s) 250 reside to the side of the detector 210 and readout circuits 230. In other embodiments the cascaded averaging circuit(s) 250 may reside underneath another layer, such as the layer including readout circuits 230. Switch 236 can be used as a reset to capacitor 232 and/or capacitor 240.

FIGS. 2B-2C are circuit diagrams depicting portions of IR detection system 200. FIG. 2B depicts pixel 212 of detector 210, readout circuit 230 and amplifiers 244 and 246. Pixel 212 is a photodiode and analogous to one of pixels 112, 114, 115 and 118. Thus, pixel 212 may be small, for example less than ten micrometers on a side. In some embodiments, pixel 212 may be not more than five micrometers on a side. Readout circuit 230 includes integration capacitor 232 and transistor 234 that are analogous to integration capacitor 132 and component(s) 134. Thus, integration capacitor 232 may occupy less than the available area corresponding to detector 212 and transistor 234. Integration capacitor 232 may also have a smaller capacitance. In some embodiments, integration capacitor 232 has a capacitance that is not more than twenty femto-Farads. Integration capacitor 232 may have a capacitance that is less than fifteen femto-Farads. In some embodiments, integration capacitor 232 has a capacitance of at least one femto-Farad and not more than ten femto-Farads. In some embodiments, integration capacitor 232 may have another capacitance. Although not shown in FIG. 2B, transistor 234 may be biased during operation of IR detection system 200. For example, slightly reverse biasing pixel/detector 212 may provide a field such that when the photon hits the detector, the electron-hole pair is provided.

Readout circuit 230 also includes averaging capacitor 240 and switches 236 and 242. Averaging capacitor 240 has a capacitance that is generally greater than the capacitance of integration capacitor 232. For example, averaging capacitor 240 may have a capacitance that is at least twice and not more than eighty multiplied by the capacitance of integration capacitor 232. In some such embodiments, averaging capacitor 240 has a capacitance that it not more than twenty multiplied by the capacitance of integrating capacitor 232.

In some embodiments, one of the amplifiers, such as amplifier 246, may be used to provide an output from averaging capacitor 240. The other amplifier, such as amplifier 244, may provide a connection to cascaded averaging circuit(s) 250.

An embodiment of cascaded averaging circuit(s) 250 are depicted in FIG. 2C. In the embodiment shown in FIG. 2C, a single stage, or a single cascaded averaging circuit 250 is used. In other embodiments, multiple cascaded averaging circuits (e.g. multiple stages) may be utilized. Cascaded averaging circuit 250 is analogous to cascaded averaging circuit 150. Cascaded averaging circuit 250 is coupled with averaging capacitor 240 via transistor 252 and amplifier, such as amplifier 244. In some embodiments, cascaded averaging circuit(s) 250 is located to the side of the pixel array of detector 210 and connected via a multiplexer (not shown). In some embodiments, cascaded averaging circuit 250 is connected in a three-dimensional stack below the circuitry depicted in FIG. 2B. Other configurations are possible. In some embodiments, the high capacitor density and small design rules may allow for more components in small pixel imager array. Cascaded averaging circuit 250 may be located nearby to pixel 212 and associated circuitry depicted in FIG. 2B. Cascaded averaging circuit 250 includes an additional integration capacitor 254, additional averaging capacitor 256, transistor 252, switch 257 and amplifier 258. Signals input to cascaded averaging circuit 250 via transistor 252 are integrated onto integration capacitor 254. After the expiration of a particular time interval, which may be larger than the integration time, switch 257 is closed and the charge on additional integration capacitor 254 is provided to additional averaging capacitor 256. This process may be repeated multiple times. Consequently, additional averaging capacitor 256 provides averaging of the signals integrated on additional subframe integration capacitor 254. The averaged signal may be output via amplifier 258.

FIG. 2D depicts an embodiment of a IR detection system 200 including pixel 212, readout circuit 230, cascaded averaging circuit 250 and associated components. FIG. 2D thus includes a particular arrangement of pixel 212/detector, readout circuit 230, averaging circuit 250, amplifiers 244, 246 and 248 and switches 242 and 257 of FIGS. 2A-2C. In the embodiment shown, readout circuit 230 includes two capacitors 232 and 240 and cascaded averaging circuit 250 includes two capacitors 254 and 256. Integrating capacitor 232, averaging capacitor 240 and switch 242 form a high gain input circuit in which current from the photodiode/pixel 212 flows through the bias controlling direct injection gate 234. Integrating capacitor 232 forms a high transimpedance gain circuit whereby the signal and other front end noise sources can undergo a significant gain to allow fast well filling and fast frame rates. However, the noise on the integrating capacitor 232 also undergoes gain. Averaging capacitor 240 provides some noise reduction. Cascaded averaging circuit 250 allows the high transimpedance with short integration times, but also provides for successively averaging the signal and noise from pixel 212 and the remainder of IR detection system 200. Thus, the lower photon flux signal for smaller pixel 212 is not dominated by the noise after cascaded signal averaging.

Readout circuit 230 provides integration of the signal from pixel 212. Readout circuit 230 also allows imaging of targets moving more quickly due to the short integration time for integration capacitor 232. More specifically, signals from pixel 212 are integrated on integration capacitor 232 during an integration time. The integration time may be in the ranges described above. For example, the integration time may be two hundred microseconds or less in some embodiments. In addition to allowing for a short integration time for integration capacitor 232, capacitor 240 allows for averaging of the signal provided from pixel 212. More specifically, after the expiration of the integration time, the charge on integration capacitor 232 is provided to averaging capacitor 240. This may be achieved by closing switch 242. This procedure may be carried out for multiple cycles, with each cycle corresponding to an integration time. Thus, averaging capacitor 240 may provide averaging of the signal from integration capacitor 232. In some embodiments, readout circuit 230 may reduce the noise on the signal from integration capacitor 232 by a factor of approximately two through five. Thus, a fast readout, for example that may be suitable for fast framing described above, may be provided while allowing for some noise reduction by averaging capacitor 240. A readout may be performed via amplifier 246, while amplifier 244 provides signals to cascaded averaging circuit 250.

Cascaded averaging circuit 250 provides additional averaging. Thus, averaging is cascaded through two sets of capacitors (232/240 and 254/256) if cascaded averaging circuit 250 is used. Cascaded averaging circuit 250 includes additional integration capacitor 254, additional averaging capacitor 256 and switch 257. The capacitance of averaging capacitor 256 is greater than the capacitance of integration capacitor 254. In some embodiments, the capacitance of averaging capacitor 256 is at least two and not more than twenty multiplied by the capacitance of integration capacitor 254.

Cascaded averaging circuit 250 reduces the noise over the signal provided by averaging capacitor 240. Cascaded averaging circuit 250 functions in a manner analogous to readout circuit 230. More specifically, after the expiration of a particular time or a particular number of integrations of integration capacitor 232, the charge on averaging capacitor 240 is provided to additional integration capacitor 254. This process is repeated a number of times. The charge on additional integration capacitor 254 is shared via the switch 257 with additional averaging capacitor 256. This may be achieved by closing switch 257. This procedure may be carried out for multiple cycles. Thus, additional averaging capacitor 256 may provide averaging of the signal from additional integration capacitor 254. For example, cascaded averaging circuit 250 may reduce the noise on the averaging capacitor 240 by about a factor of at least two and not more than five in some embodiments. In some embodiments, the sum of the capacitances of integration capacitor 232 and averaging capacitor 240 is greater than two femto-Farads. In some embodiments, the sum of the capacitances of integration capacitor 232 and averaging capacitor 240 is greater than ten femto-Farads. Similarly, in some embodiments, the sum of the capacitances of additional integration capacitor 254 and additional averaging capacitor 256 is greater than two femto-Farads. In some embodiments, the sum of the capacitances of additional integration capacitor 254 and additional averaging capacitor 256 is greater than ten femto-Farads. For example, capacitor 254 may be at least one femto-Farad and not more than ten femto-Farads in some embodiments. In some embodiments, capacitor 256 may have a capacitance of at least two femto-Farads and not more than fifty femto-Farads. In some embodiments, amplifier 244 and capacitor 254 may be omitted, for example if there is low enough interconnection capacitance from capacitor 240 to capacitor 256.

Capacitors 232 and 240 and transistor 234 of readout circuit 230 function in an analogous manner to capacitors 254 and 256 and transistor 252 of cascaded averaging circuit 250. Readout circuit 230 and cascaded averaging circuit 250 may also function together. Suppose averaging capacitor 240 is averaged for $K_1$ cycles, while averaging capacitor 256 is averaged for $K_2$ cycles. Thus, each of the $K_2$ cycles includes $K_1$ averages of averaging capacitor 240. In operation, integration capacitor 232 is charged while switches 236 and 242 are open. Periodically, upon the expiration of time intervals equal to the integration time, switch 242 is closed and the charge from integration capacitor 232 is provided to averaging capacitor 240. This occurs $K_1$ times. This more rapidly changing, averaged (fast frame) signal may be read onto the line coupled with amplifier 246. The signal from averaging capacitor 240 is also provided via amplifier 244 and transistor 252 to additional integration capacitor 254. Additional integration capacitor 254 thus receives a signal that has been averaged a $K_1$ times through averaging capacitor 240. Switch 257 is periodically closed to allow charge from additional integration capacitor 254 to be provided to additional averaging capacitor 256. This occurs $K_2$ times. The signal from additional averaging capacitor 256 may be read out on the line coupled with amplifier 258. These operations repeat cyclically. Thus, a faster averaged signal may be output from averaging capacitor 240, while a lower noise, further averaged signal may be output from additional averaging capacitor 256. As a result, IR detection system 200 may have similar benefits as IR detection system 100. Thus, target detection, bullet trace back, detection of ultrasonic and hypersonic targets, detection of dim targets, improved resolution of distant targets and other applications may be facilitated.

Figure 3:
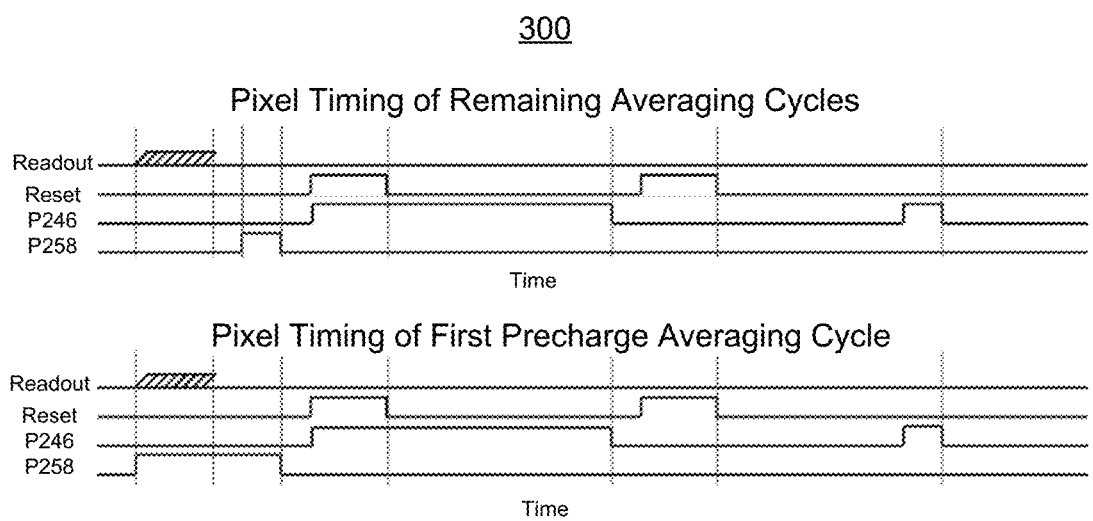
FIG. 3 depicts an embodiment of timing usable for an infrared detection system including a cascaded averaging circuit.

In some embodiments, precharging may be utilized. FIG. 3 depicts an embodiment of timing 300 usable for an IR detection system including a cascaded averaging circuit, such as integration detection system 200. Thus, timing 300 is described in the context of infrared detection system 200. In other embodiments, other timing may be used. Operation of infrared detection system 200 with precharging may be explained utilizing timing 300 as follows. As in the example above, averaging capacitor 240 is averaged for $K_1$ cycles, while averaging capacitor 256 is averaged for $K_2$ cycles. Thus, each of the $K_2$ cycles includes $K_1$ averages of averaging capacitor 240. Also, in some embodiments, the clock used in timing the IR detection system may be selected to be a multiple of the sampling rate. Selecting a clock cycle that is greater than the sampling rate (e.g. the multiple of the sampling rate) may mitigate noise.

A timing cycle beings during readout of the previously completed frame's signals through amplifier 246 (e.g. for a fast frame reading) and/or through amplifier 258 (for a lower noise readout) onto corresponding columns lines. During this read period, additional averaging capacitor 256 may be precharged. In addition, the averaged, integrated signal may be sampled from averaging capacitor 240 onto additional integration capacitor 254 through amplifier 244. This readout is accomplished by holding switch 257 closed during readout row selection. For the next $K_2$-1 frames out of $K_2$ frames of total cascaded averaging cycles, switch 257 is closed only after each readout of averaging capacitor 240 is completed. At this time additional averaging capacitor 256 has a lower noise copy of the charge accrued by averaging capacitor 240. Momentarily closing switch 257 thus performs the cascaded averaging operation from capacitor 254 onto capacitor 256.

Between each readout period for cascaded averaging circuit 250, readout circuit 230 is performing a similar precharge and averaging function for $K_1$ cycles. Photodiode/pixel 212 produces a photo signal that is integrated onto integration capacitor 232 in response to conditions set by bias transistor 234 and the photo signal. The period of integration is defined as the time between switch 236 opening and switch 242 opening in sequence. Switch 236 is momentarily closed at the beginning of each integration cycle to empty integration capacitor 232. Switch 242 and switch 257 are closed for the first cycle out of $K_1$ total integration averaging cycles in order to empty averaging capacitor 240. In such an embodiment, $K_1$ is an integer selected to provide the desired amount of averaging. Further, for the first cycle switch 236 is opened while switch 242 remains closed for an extended period. Thus, averaging capacitor 240 is precharged to a voltage close to the expected final value. Averaging capacitor 240 may not be reset because the previous integrated voltage on averaging capacitor 240 is typically near the final value. Not resetting and/or precharging averaging capacitor 240 may allow faster noise settling rate and hence faster frame rates. During the next $K_1$-1 cycles switch 242 is closed momentarily at the end of each integration period to perform the averaging operation from capacitor 232 onto capacitor 240.

Precharging aids in presettling the signal, for example were motion or scene changes are significant. However, in some embodiments, not resetting averaging capacitor 240 may have an improved effect because precharging has uniformities imposed by capacitor variation and integration time adjustments. During motion of system 200 or of targets, additional techniques to reduce blur and improve frame rate can also be utilized. Precharging allows the pixel voltage to settle closer to the new dynamically changing flux values. The ability to precharge averaging capacitor 240 to close to its final value allows more rapid reduction of the noise on the circuits 230 and 250. This allows a faster frame rate out each stage of ROIC 220. However, system 200 can operate both utilizing precharging and without utilizing precharging. In some embodiments, the input circuit to integration capacitor 232 may be a CTIA, buffered direct injection, source follower or other variant of input circuit. In such embodiments, averaging by capacitor 240 and cascaded averaging circuit 250 may still reduce noise.

Readout circuit 230 and cascaded averaging circuit 250 each has a settling time associated with both the noise and the ratio of the capacitance of the averaging capacitor 240 or 256 to the integration capacitor 232 and 240. In other words, the averaging capacitance divided by the integration capacitance affects the settling time for readout circuit 230 and cascaded averaging circuit 250. The settling time may be reduced using precharging. If IR detection system 200 is desired to operate at high frame rate to reduce or prevent smear due to high platform motion, a small ratio of the averaging capacitance(s) to the integration capacitance(s) may be used. For slower more stationary imagery, such a fixed mounting or slow movements, a larger ratio of the averaging capacitance(s) to the integration capacitance(s) can be chosen. In some embodiment, the ratio of the capacitances of integration capacitor 232 to averaging capacitor 240 may be selected to match the flux of a lens, such as lens 102, used with system 200. In some embodiments, multiple capacitors can be utilized in place of single capacitors for the readout circuit 230 and/or cascaded averaging circuit 250. In such an embodiment, capacitor(s) may be selectively switched into a variable gain mode to allow a variable ratio of averaging capacitance(s) to integration capacitance(s). Even if signals are not fully settled before a particular number of integrations, system 200 may still be utilized.

In some embodiments the fast frame output can be read from amplifier 246 at the end of any number of cycles. Reading from amplifier 246 may allow for adaptation to target speed while minimizing smear. In some embodiments, the output of amplifier 246 can be used for simultaneous high dynamic range frames extending the upper level of dynamic range with periodic integration onto both the integration capacitor 232 and averaging capacitor 240 by keeping switch 242 closed during a shorter integration time. For example, if $K_1$=10 fast frame cycles (number of integrations for integration capacitor 232 before sampling) and $K_2$=10 cycles (number of integrations of integration capacitor 254 before sampling), every full integrate cycle ($K_2$ cycles completed) corresponds to one hundred fast frame cycles. For high dynamic range if the integration time is reduced by a factor ten, then the total dynamic flux range is increased by a factor of ten for the shorter integration time. Thus, every one hundred cycles can have a high dynamic range integration inserted, with an integration time that is reduced by a factor of ten. In such an embodiment, the amount of additional high end dynamic range comes at a cost of just more than $\frac{1}{1000}^{th}$ additional time of integration within the $K_1$ and $K_2$ cycles. In some embodiments, this extends the dynamic range. The dual channel output (through amplifiers 246 and 258) make this readout possible. The high dynamic range settings may be cued by the output of additional averaging capacitor 256.

In some embodiments, $K_1$ (the number of fast fame cycles/averages for fast readout circuit 23), $K_2$ (the number of cycles/averages for cascaded averaging circuit 230), and/or integration times (e.g. operation switches 242 and 257) may be set dynamically. Thus, $K_1$ and $K_2$ may be selected to account for different motion conditions in such embodiments. For stationary imaging, with low expected motion, typically $K_1$ and $K_2$ may each be between 6-20 cycles. For motion, the $K_1$ and $K_2$ cycles may be shortened progressively to mitigate smear and blurring.

Use of readout circuit 230 in conjunction with cascaded averaging circuit 250 may greatly increase effective well capacity, allow the sensitivity for smaller pixels 212 to approach and exceed that of larger pixels, provide higher resolution, improve national image interpretability rating scale (NIIRS), enhance contrast and improve minimum resolvable temperature difference (MRTD). For example, ROIC 220 may allow both medium and small pixel sensors to achieve short integration times enabling framing rates in excess of 1000 FPS. In an embodiment where averaging capacitor 240 is not reset, the output from averaging capacitor 240 may achieve the sensitivity of a sensor with a much longer integration time without the added area requirement of a larger capacitor. For example by not resetting capacitor 240 the noise on the output capacitor 240 may settle over several milliseconds of averaging to a minimum noise floor. Although not shown, a lens having a low f-number analogous to lens 102 may be utilized.

Cascaded averaging circuit 250 may use much smaller capacitors and still achieve significant noise reduction. For example, a capacitance ratio of the additional integration capacitance of additional integration capacitor 254 to the additional averaging capacitance of additional averaging capacitor 256 of 8/80 may provide the same performance as a capacitance ratio of 2/20 in noise reduction while consuming only one-fourth the area. If a smaller set of capacitors is selected, the capacitor size is chosen to not increase the KTC noise associated with smaller capacitors. This lower area utilization allows multiple cascades of averaging in the pixel 212 or nearby the pixel 212 creating a very compact and highly effective noise averaging mechanism.

In some embodiments, high dynamic range (HDR) can be accomplished by using the dual outputs from amplifiers 246 and 258 sequentially. In such embodiments, operation of IR detection system 200 may differ. For using HDR frame timing, one out of N frames may be utilized as follows. Averaging capacitor 240 is reset with integration capacitor 232 by closing switch 236 before HDR integration begins. The readout circuit 230 is configured with switch 242 held closed during integration. When switch 242 is closed during integration, the input capacitance is the sum of the capacitances of integration capacitor 232 and averaging capacitor 240. In some embodiments, this may be approximately nine multiplied by the integration capacitance of integration capacitor 232. A very short integration time for very high flux signal capture is used (typically a few microseconds or less) may also be used. Pixel 212 from amplifier 246 are read out but are not mirrored over cascaded averaging circuit 250. Averaging capacitor 240 is reset with integration capacitor 232 by momentarily closing switch 236 after HDR integration ends and pixels are read out. Reset of the readout circuit 230 after the HDR cycle prevents signals from the HDR cycle from mixing with the low dynamic range (LDR) signal cycles. For the remainder of frames 2 though N, normal operation is utilized for readout circuit 230 and cascaded averaging circuit 250. This may achieve LDR for normal background flux, in a manner described in the timing for FIG. 2D. Optional precharging of averaging capacitors 240 and 256 may be employed is based upon the required settling time and speed of targets and movement of the sensing platform. LDR signals may be read out from amplifier 246 and/or amplifier 258 following each cycle, depending on speed of targets and movement of the sensing platform. In another embodiment the HDR frame may be accomplished nearly simultaneously while maintaining LDR cycles in all N frames, by adding an independent HDR fast frame circuit that does not require the use of one of the normal or LDR averaging cycle frames.

Figure 4:
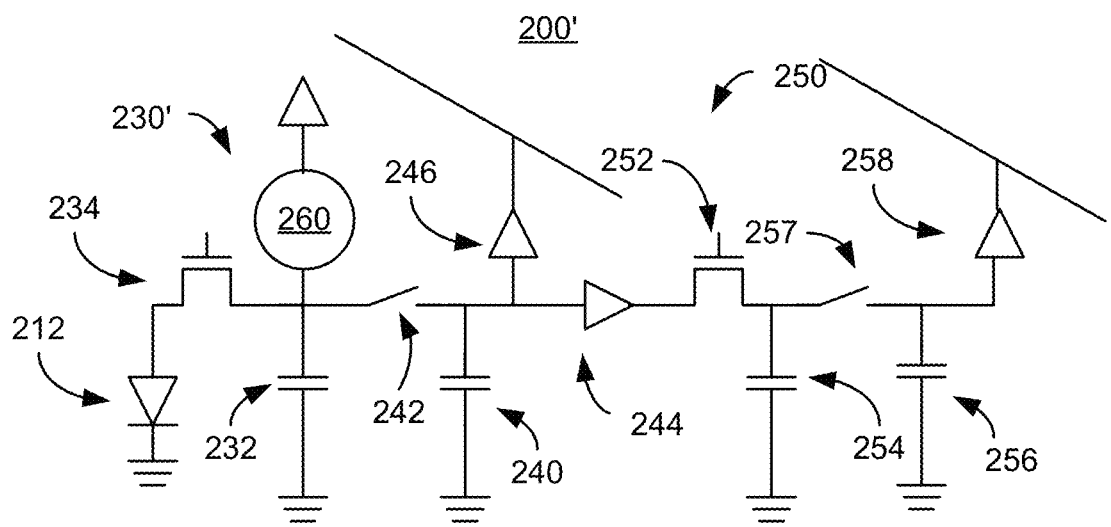
FIG. 4 depicts another embodiment of an infrared detection system including a cascaded averaging circuit and charge skimming.

FIG. 4 depicts another embodiment of IR detection system 200' including charge skimming. IR detection system 200' is analogous to IR detection system 200 and thus includes analogous components and may have analogous benefits. In addition, readout circuit 230' includes charge skimming module 260. Charge skimming can be utilized to remove background charge. IR detection system 200' also allows detectors, such as detector 210 having pixel 212, to work at higher dark current (Idark). Charge skimming in connection with multiple averages carried out in circuits 230 and 250 may achieve an improvement signal to noise. In some embodiments, this improvement may be by factor greater than nine. In some such embodiments, the improvement may be by a factor of greater than sixteen. Charge skimming of various types may be used to effectively subtract the excess dark current off of leaky detectors. IR detection system 200', which utilizes small pixels 212 and multiple averages in circuits 230 and 250, charge skimming allows for a higher dark current detector with precision charge skimming. Consequently, improvements in signal to noise levels may be obtained.

Charge skimming module 260 may be a programmable current source, a switched capacitor charge subtraction, a resistive constant current connected to a voltage source, and/or other mechanism that may provide global or pixel by pixel current removal or skimming. Several methods may be deployed to accurately subtract off excess current that may be injected at the input node due to high excess dark current. In some embodiments, excess noise and residual fixed pattern noise may remain when utilizing charge skimming module 260. The excess fixed pattern noise after charge skimming can be reduced to near the temporal noise floor. For example, a Scene Based Non Uniformity Correction (SBNUC) may reduce such noise. SBNUC running on output video from amplifier 258 may in some embodiments reduce spatial noise by greater than a factor of sixty-four with three or more average capacitors (e.g. an additional cascaded averaging circuit not shown in FIG. 4). The use of the SBNUC may reduce the fixed pattern noise associated with drift, dark current changes, and 1/f noise. Moreover, IR detection system 200' may allow for near room temperature detectors in some embodiments. For example, even if the dark current is significantly greater than the photocurrent from pixel 212, the increase in the photocurrent induced shot noise may still be mitigated by readout circuit 230 and cascaded averaging circuit 250 of IR detection system 200'.

Figure 5:
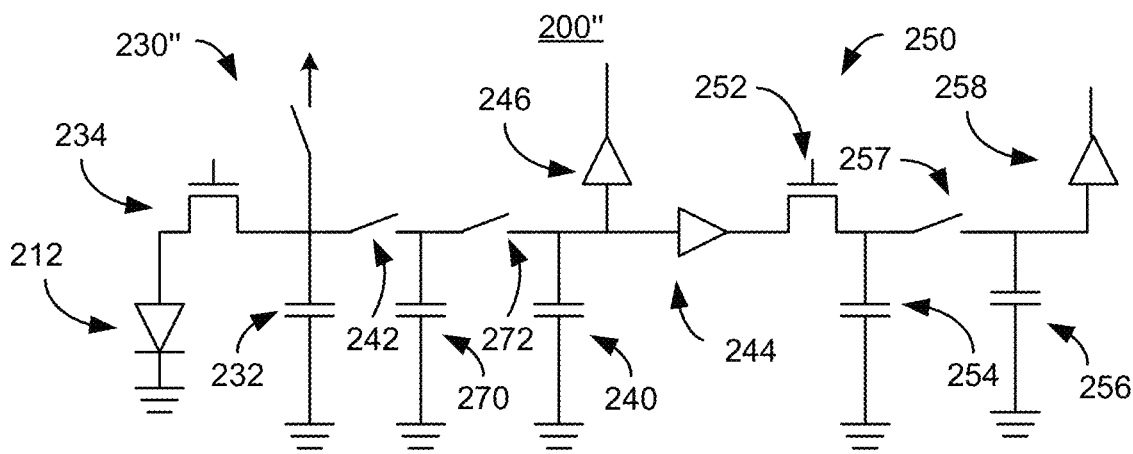
FIG. 5 depicts another embodiment of an infrared detection system including a cascaded averaging circuit and additional capacitors.

FIG. 5 depicts another embodiment of IR detection system 200" including a cascaded averaging circuit and an additional capacitor. IR detection system 200" is analogous to IR detection system 200 and thus includes analogous components and may have analogous benefits. In addition, readout circuit 230" includes an additional capacitor 270 and corresponding switch 272. Thus, readout circuit 230' is a three capacitor readout circuit instead of a two capacitor readout circuit. Stated differently, instead of a single averaging capacitor 240, two capacitors 240 and 270 are used. For IR detection system 200", the first integration prior to noise averaging occurs on capacitors 232 and 270 together with switch 242 closed. Integrating on capacitors 232 and 270 with switch 242 closed and switch 257 open allows the combined transimpedance gain to depend upon both capacitors 232 and 270 (e.g. $Z=q/(C_{apacitor\ 232}+C_{apacitor\ 270})$. For averaging, switch 242 is opened and switch 272 closed. Averaging occurs on the signal between capacitors 232 and 270. The integration-then-average process is repeated N times where multiple integration signals on capacitors 232 and 270 are then shared from capacitor 270 to averaging capacitor 240. Cascaded averaging circuit 250 is analogous to and operates in an analogous manner to that described above. In other embodiments, cascaded averaging circuit 250 might include three capacitors. In general, other numbers of capacitors can be used in readout circuit 230 and/or cascaded averaging circuit 250.

Readout at amplifier 246 allows a higher effective well capacity for readout circuit 230". However, in some embodiments this may be at the expense of a slower frame time (e.g. time to complete $K_1$ cycles). For example, in some embodiments, the frame time may exceed 1 millisecond. Thus, reducing smearing in highly dynamic vibration and moving targets may be more challenging. In some cases, the three capacitor circuit of 230" can provide improved sensitivity at the expense of slower total averaged integration time. As discussed above, smaller capacitances having the same capacitance ratio may be used in cascaded averaging circuit 250 while achieving analogous noise reduction.

Figure 6:
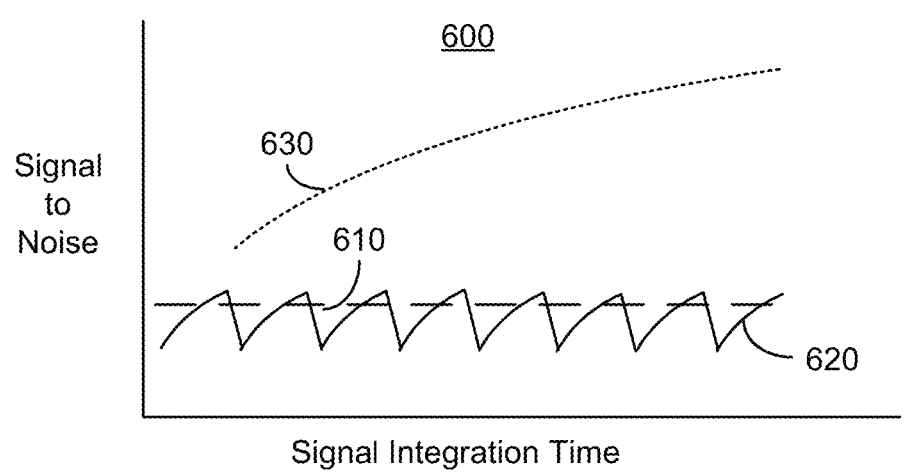
FIG. 6 is a graph illustrating exemplary evolution of noise reduction in an embodiment of an infrared detection system including a cascaded averaging circuit.

FIG. 6 is a graph 600 illustrating exemplary evolution of noise reduction in an embodiment of an infrared detection system including a cascaded averaging circuit and utilizing small pixels. Thus, FIG. 6 is discussed in the context of IR detection system 200. Dashed line 610 indicates the signal to noise ratio with a single capacitor (not shown). Solid line 620 indicates the single-to-noise for signals output on amplifier 246, after averaging by capacitor 240. Dotted line 630 indicates the signal-to-noise for signals output on amplifier 258, after averaging by capacitors 240 and 256. This signal to noise improvement occurs when the reset is applied to 240 each full frame. Thus, a noise improvement may be provided for signals output on amplifier 246. However, a significant improvement may be achieved for signals provided from averaging capacitor 256.

Figure 7:
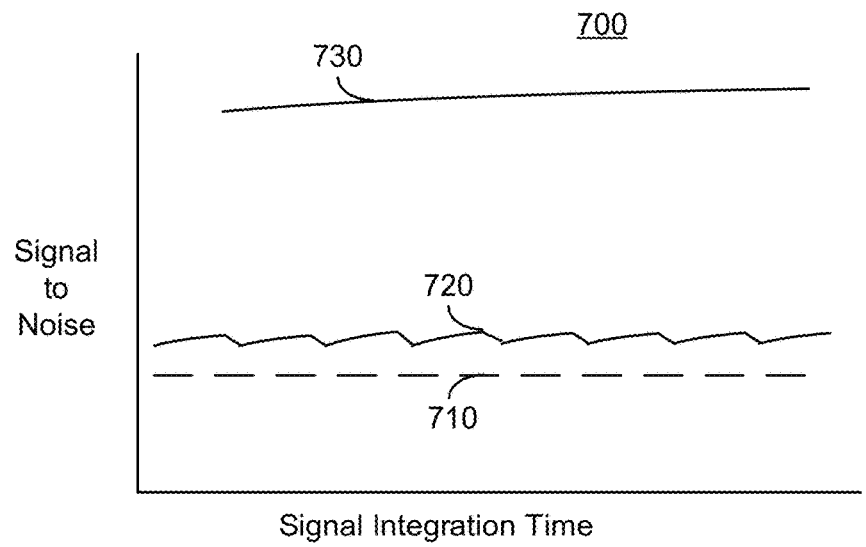
FIG. 7 is a graph illustrating exemplary signal-to-noise ratios for an infrared detection system including a cascaded averaging circuit versus other infrared detection systems.

FIG. 7 is a graph 700 illustrating exemplary signal-to-noise ratios for an IR system including a cascaded averaging circuit when the capacitor 240 is not reset each frame. Thus, FIG. 7 is discussed in the context of IR detection system 200. Dashed line 710 indicates the signal to noise ratio with a single capacitor (not shown). Solid line 720 indicates the single-to-noise for signals output on amplifier 246, after averaging by capacitor 240. Dotted line 730 indicates the signal-to-noise for signals output on amplifier 258, after averaging by capacitors 240 and 256. Thus, as IR detection system 200 continues to average down noise over many frames or many milliseconds when averaging capacitor 240 is not reset each frame read, further settled noise improvements may be achieved. Not resetting averaging capacitors allows achieving low noise for pixels which average continuously over frame boundaries in the scene where the pixels have very little incident power change over several frames. The noise reduction by each stage of IR detection system 200 varies when the sensor is moving with respect to the targets. The most dynamic conditions of varying scene flux may require "presetting" the signal values with the first averaged frame in an averaging sequence. These conditions may also allow a very low noise floor for pixels in scenes which have very little incident power change. However, the multiple averages in the circuits 230 and 250, allows the noise to settle to the lower level. Thus, as previously indicated, IR detection system 200 may provide lower noise levels.

Figure 8:
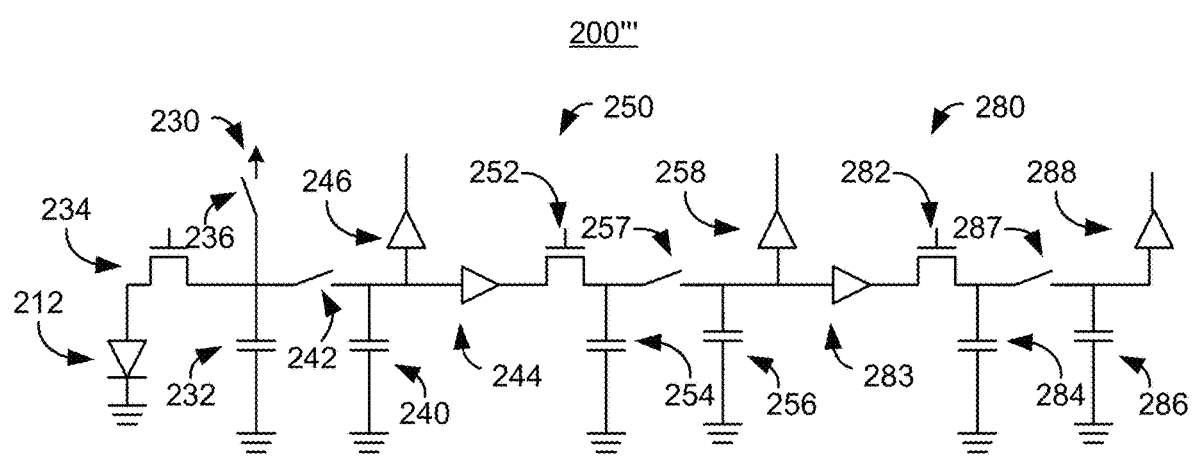
FIG. 8 depicts another embodiment of an infrared detection system including multiple cascaded averaging circuits.

FIG. 8 depicts another embodiment of IR detection system 200''' including multiple cascaded averaging circuits. IR detection system 200''' is analogous to IR detection system 200 and thus includes analogous components and may have analogous benefits. In addition, IR detection system 200''' includes a second cascaded averaging circuit 280. Cascaded averaging circuit 280 includes transistor 282, input amplifier 283, integration capacitor 284, averaging capacitor 286, switch 287 and output amplifier 288. Cascaded averaging circuit 280 is analogous to cascaded averaging circuit 250 and operates in a similar manner. Thus, more than two stages of averaging capacitors may be used in an IR detection system. The additional stage(s), such as cascaded averaging circuit 280, may be utilized for additional noise averaging. In some embodiments, the input to each successive stage is driven and may settle in less than one microsecond. Consequently, multiple stages may be used for achieving even faster frame rates at the input to the pixel. Multiple stages might also be used to drive down noise, for example from very high leakage detectors. Because of the compactness, a three or more stage cascade FPA detection system, such as IR detection system 200''' may be developed for smaller pixel. Because of the compactness and multiplexing, all the components may reside near the pixel.

IR detection system 200''' may include a first very high gain state integration readout circuit 230, followed by the first cascaded averaging circuit 250 and then second cascaded averaging circuit 280. Transistors 252 and 282 may act as the access switches or multiplexers to time the signal averaging with the proper cells during scanning of the inputs/outputs of each stage of IR detection system 200'''. Cascaded averaging circuit 280 uses integration capacitor 284 and averaging capacitor 286. Switch 287 allows integration capacitor 284 to average onto averaging capacitor 286. The outputs via amplifiers 246, 258 and 288 may have dedicated multiplexed outputs, may have 2 outputs which are switched or shared, or may have one output that is switched or multiplexed. Thus, analogous benefits to those described above may be provided by IR detection system 200''.

Figure 9:
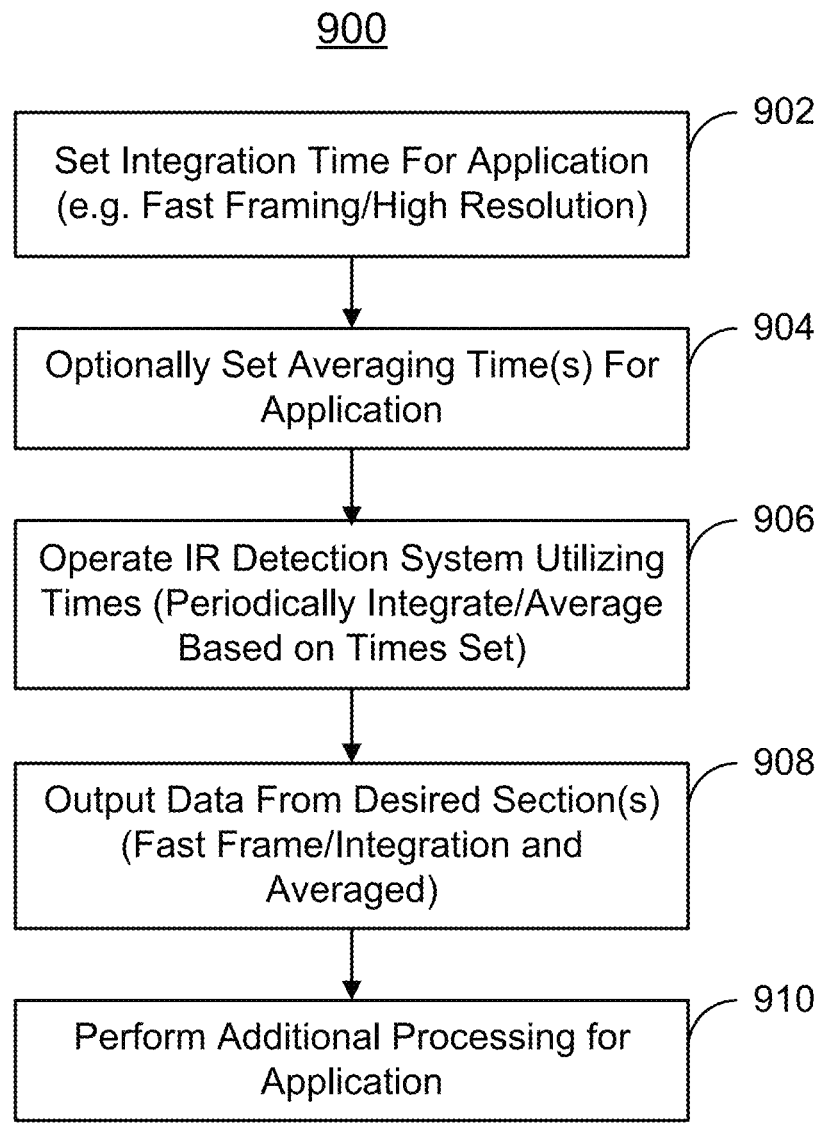
FIG. 9 is a flow chart depicting an embodiment of a method for utilizing an infrared detection system.

FIG. 9 is a flow chart depicting an embodiment of method 900 for utilizing an infrared detection system. Method 900 may include substeps. In addition, in some embodiments, steps and/or sub steps may be performed in another order, including in parallel. Further, although described in the context of single pixel, method 900 may extended to multiple pixels in a detector array. For example, the pixels in the detector may be raster scanned, portions method 900 may be carried out for each pixel and the output used to provide a video readout or still image.

The integration time for a readout of a pixel is set, at 902. The integration time selected may be based upon the size of the integration capacitor, light background, collection optics, as well as other factors such as whether fast framing and/or high resolution are desired for the pixel. For example, if a bright source is sensed in the image being captured, the integration time may be adaptively reduced or increased to provide an unsmeared representation of the image and readout to an external processor. For example, in some embodiments, integration times of 200 microseconds or less may be set at 902. Integration times of one hundred microseconds or less may be used in some cases. In some embodiments, the number of cycles for which integration is carried out (e.g. $K_1$) is also set at 902. The number of cycles may increase with decreasing integration time. Thus, the frequency at which the charge at the integration capacitor is provided to the averaging capacitor of a readout circuit is determined at 902.

In some embodiments, the number of averaging cycles and total averaging time(s) are set at 904. The averaging time corresponds to the number of integration cycles that are averaged by cascading averaging circuit(s). For multiple cascaded averaging circuits, multiple averaging times may be set at 904. Thus, the frequency at which the charge at an averaging capacitor of a particular circuit is provided to the integration capacitor of a next circuit is determined at 904.

The IR detection system is operated using the integration times and averaging times, at 906. Thus, the signal from the pixel(s) are provided to the corresponding readout circuit, the signal at the integration capacitor is provided to the averaging capacitor, the signal at the averaging capacitor is provided to a subsequent stage, and the output of the averaging capacitor(s) is read at 906. In some embodiments, 906 may include precharging one or more of the capacitors used.

In addition, data are output from the desired sections of the IR detection system, at 908. For example, the averaging capacitor for the readout circuit and/or the averaging capacitor(s) for cascaded averaging circuit(s) may be sampled at 908. This sampling may occur at different frequencies for different outputs. Thus, both faster readout and lower noise/further averaged signals may be output depending on which tap(s) of video from circuit is selected. Additional processing of the output signal may be performed, at 910. This processing may depend upon the application for which the IR detection system is used. Thus, using method 900, the benefits of the IR detection systems described herein may be realized.

Although various components and features of IR detection systems 100, 200, 200', 200" and 200''' and method 900 have been described, such components and features may be combined in manners not explicitly described herein.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A integrated circuit, comprising:
   a plurality of readout circuits, a readout circuit of the plurality of readout circuits including an integration capacitor and an averaging capacitor, the integration capacitor being coupled with a pixel of a photodetector pixel array, the pixel having a pixel area, an available area less than the pixel area being usable for layout of the integration capacitor, the integration capacitor having a capacitor area less than the available area, the integration capacitor having an integration capacitance, the averaging capacitor having an averaging capacitance greater than the integration capacitance; and
   at least one cascaded averaging circuit coupled with the averaging capacitor of the readout circuit, the at least one cascaded averaging circuit including a first cascaded averaging circuit having and additional integration capacitor, an additional averaging capacitor coupled with the additional integration capacitor, and a switch coupled with the additional integration capacitor and the additional averaging capacitor, the additional integration capacitor having an additional integration capacitance, the additional averaging capacitor having an additional averaging capacitance greater than the additional integration capacitance, a first sum of the averaging capacitance and the integration capacitance being less than a second sum of the additional averaging capacitance and the additional integration capacitance.

2. The integrated circuit of claim 1, wherein the readout circuit further includes:
   a transistor coupled to the pixel and the integration capacitor, the transistor having a transistor area, the available area being not larger than the pixel area minus the transistor area.

3. The integrated circuit of claim 2, wherein the readout circuit further includes:
   a switch coupled with the integration capacitor and the averaging capacitor, the switch being configured to provide a variable integration time for the integration capacitor.

4. The integrated circuit of claim 1, wherein the at least one cascaded averaging circuit further includes:
   a second averaging circuit coupled with the additional averaging capacitor.

5. The integrated circuit of claim 1, wherein the first cascaded averaging circuit of the at least one cascaded averaging circuit is coupled to the averaging capacitor through a transistor.

6. The integrated circuit of claim 1, further comprising:
   a charge skimming circuit coupled with the integration capacitor.

7. The integrated circuit of claim 1, wherein the integration capacitance is less than twenty femto-Farads.

8. The integration circuit of claim 1, wherein the integration capacitance is less than ten femto-farads and at least one femto-Farad.

9. The integrated circuit of claim 8, wherein the f-number is greater than 0.8 and less than 1.5.

10. The integrated circuit of claim 1, wherein the pixel receives a photo signal from a lens having an f-number less than a Nyquist sampling f-number.

11. The integrated circuit of claim 1, wherein the second sum is at least five multiplied by the first sum.

12. The integrated circuit of claim 1, wherein the integration capacitor has an integration time not exceeding two hundred microseconds.

13. The integrated circuit of claim 12, wherein the additional integration capacitor has an additional integration time greater than the integration time.

14. The integrated circuit of claim 1, wherein the pixel of the photodetector has a pitch not exceeding ten micrometers.

15. The integrated circuit of claim 1, wherein the additional integration capacitor samples the averaging capacitor after multiple integration cycles of the integration capacitor and the additional averaging capacitor provides an output after multiple additional integration cycles of the additional integration capacitor.

16. A detection system comprising:
   a photodetector pixel array including a plurality of pixels and receiving a photo signal from the lens;
   a plurality of readout circuits, each readout circuit of the plurality of readout circuits including an integration capacitor and an averaging capacitor, the integration capacitor being coupled with a pixel of the plurality of pixels; and
   at least one cascaded averaging circuit coupled with the averaging capacitor of the each readout circuit, the at least one cascaded averaging circuit including a first cascaded averaging circuit having and additional integration capacitor, an additional averaging capacitor coupled with the additional integration capacitor, and a switch coupled with the additional integration capacitor and the additional averaging capacitor, the additional integration capacitor having an additional integration capacitance, the additional averaging capacitor having an additional averaging capacitance greater than the additional integration capacitance, a first sum of the averaging capacitance and the integration capacitance being less than a second sum of the additional averaging capacitance and the additional integration capacitance.

17. The detection system of claim 16, wherein the pixel has a pixel area corresponding to a maximum capacitance of the integration capacitor, the integration capacitor having an integration capacitance less than the maximum capacitance, the averaging capacitor having an averaging capacitance greater than the integration capacitance.

18. The detection system of claim 17, wherein the readout circuit further includes:
   a switch coupled with the integration capacitor and the averaging capacitor, the switch being configured to provide a variable integration time for the integration capacitor.

19. The detection system of claim 17 further comprising:
   a lens having an f-number less than a Nyquist sampling f-number.

20. The detection system of claim 19, wherein the integration capacitance is less than ten femto-farads and at least one femto-Farad.

21. A method, comprising:
   setting an integration time for a plurality of readout circuits, a readout circuit of the plurality of readout circuits including an integration capacitor and an averaging capacitor, the integration capacitor being coupled with a pixel of a photodetector pixel array, the pixel having a pixel area, an available area less than the pixel area being usable for layout of the integration capacitor, the integration capacitor having a capacitor area less than the available area, the integration capacitor having an integration capacitance, the averaging capacitor having an averaging capacitance greater than the integration capacitance, the integration time being based on the integration capacitance;

performing integrations of the integration capacitor at intervals based on the integration time;

receiving the integrations of the integration capacitor at the averaging capacitor;

periodically receiving an averaged signal from the averaging capacitor in at least one cascaded averaging circuit coupled with the averaging capacitor of the readout circuit, the at least one cascaded averaging circuit including a first cascaded averaging circuit having and additional integration capacitor, an additional averaging capacitor coupled with the additional integration capacitor, and a switch coupled with the additional integration capacitor and the additional averaging capacitor, the additional integration capacitor having an additional integration capacitance, the additional averaging capacitor having an additional averaging capacitance greater than the additional integration capacitance, a first sum of the averaging capacitance and the integration capacitance being less than a second sum of the additional averaging capacitance and the additional integration capacitance; and outputting from the at least one cascaded averaging circuit a cascaded averaged signal based on the averaged signal.

22. The method of claim 21, wherein the pixel receives a photo signal from a lens having an f-number less than a Nyquist sampling f-number.

* * * * *

UNITED STATES PATENT AND TRADEMARK OFFICE
CERTIFICATE OF CORRECTION

| | |
|---|---|
| PATENT NO. | : 11,436,823 B1 |
| APPLICATION NO. | : 16/746759 |
| DATED | : September 6, 2022 |
| INVENTOR(S) | : John Caulfield, Jon Paul Curzan and Kenton Veeder |

It is certified that error appears in the above-identified patent and that said Letters Patent is hereby corrected as shown below:

On the Title Page

In page 2, Column 2, item (56), U.S. patent documents, cite no. 53, delete "Akahori" and insert --Akabori--, therefor.
In page 3, Column 1, item (56), other publications, cite no. 15, before "Sensors", delete "an" and insert --on--, therefor.

In the Claims

In Column 19, Line(s) 27, Claim 1, after "having", delete "and" and insert --an--, therefor.
In Column 20, Line(s) 33, Claim 16, after "having", delete "and" and insert --an--, therefor.
In Column 22, Line(s) 1, Claim 21, after "having", delete "and" and insert --an--, therefor.

Signed and Sealed this
Nineteenth Day of September, 2023

*Katherine Kelly Vidal*

Katherine Kelly Vidal
*Director of the United States Patent and Trademark Office*